United States Patent [19]

Victoria

[11] Patent Number: 5,431,325

[45] Date of Patent: Jul. 11, 1995

[54] METHOD AND APPARATUS FOR PRODUCING HERMETIC TORQUE CONVERTER SEAM

[75] Inventor: Alfred B. Victoria, Warren, Mich.

[73] Assignee: Ford Motor Company, Dearborn, Mich.

[21] Appl. No.: 173,238

[22] Filed: Dec. 27, 1993

[51] Int. Cl.6 .............................................. B23K 20/12
[52] U.S. Cl. ................................. 228/114.5; 29/889.5
[58] Field of Search ............................. 228/114.5, 2.3; 29/889.5

[56] References Cited

U.S. PATENT DOCUMENTS

| | | | |
|---|---|---|---|
| 2,358,469 | 9/1944 | Neracher | 29/899.5 |
| 2,421,360 | 5/1947 | Swennes | 29/889.5 |
| 3,662,941 | 5/1972 | Gage | 228/114.5 |
| 3,869,258 | 3/1975 | Scott | 29/889.5 |
| 4,106,172 | 8/1978 | Bache | 228/114.5 |
| 4,323,185 | 4/1982 | Grilli et al. | 228/114.5 |
| 4,833,295 | 5/1989 | Locker et al. | 219/121.63 |
| 4,868,365 | 9/1989 | Farone et al. | 219/121.64 |
| 4,993,150 | 2/1991 | Reinhardt et al. | 123/90.51 |
| 5,000,366 | 3/1991 | Beattie | 29/889.5 |
| 5,027,996 | 7/1991 | Fefeu et al. | 228/114.5 |
| 5,188,278 | 2/1993 | Amao | 228/212 |
| 5,240,167 | 8/1993 | Ferte et al. | 228/114.5 |

FOREIGN PATENT DOCUMENTS

| | | | |
|---|---|---|---|
| 2125632 | 9/1972 | France | 228/2.3 |
| 1293141 | 10/1972 | United Kingdom | 228/114.5 |
| 2011816 | 7/1979 | United Kingdom | 228/114.5 |

OTHER PUBLICATIONS

"Friction Welding Becomes A Production Process," *Metalworking Production* (Jan. 24, 1962) pp. 65–67.

Primary Examiner—Mark Rosenbaum
Assistant Examiner—Jeffrey T. Knapp
Attorney, Agent, or Firm—Donald A. Wilkinson; Roger L. May

[57] ABSTRACT

A method and apparatus for joining a torque converter impeller assembly and a cover assembly are available to produce a torque converter having a hermetically sealed weld seam without the use of filler material. One of the assemblies is mounted on a stationary mount while the other assembly is mounted on a movable mount that aligns the two assemblies and can be rotated and moved axially relative to the stationary mount. The two assemblies are brought and held together while relative rotation between the two exists and then, when a predetermined interval is reached, the relative rotation is stopped and a forging force is applied. The heat from the rubbing allows the two assemblies to be plastically deformed and produce a friction weld, producing a torque converter having the proper dimensions.

6 Claims, 1 Drawing Sheet

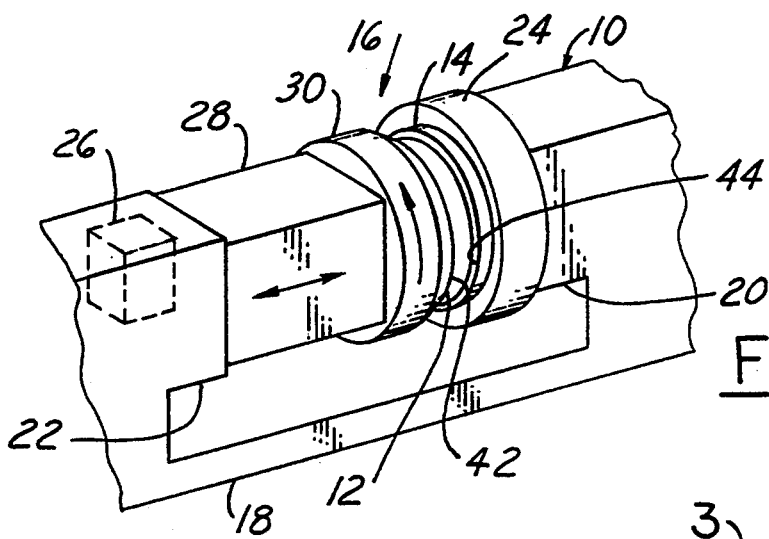
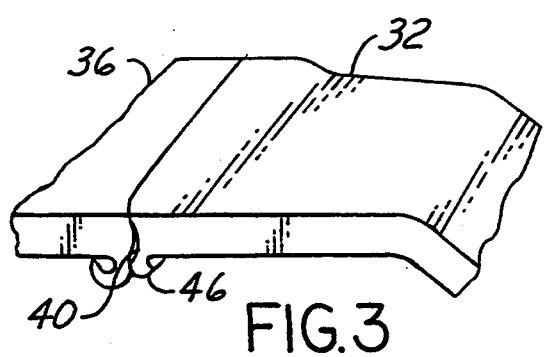
FIG. 3
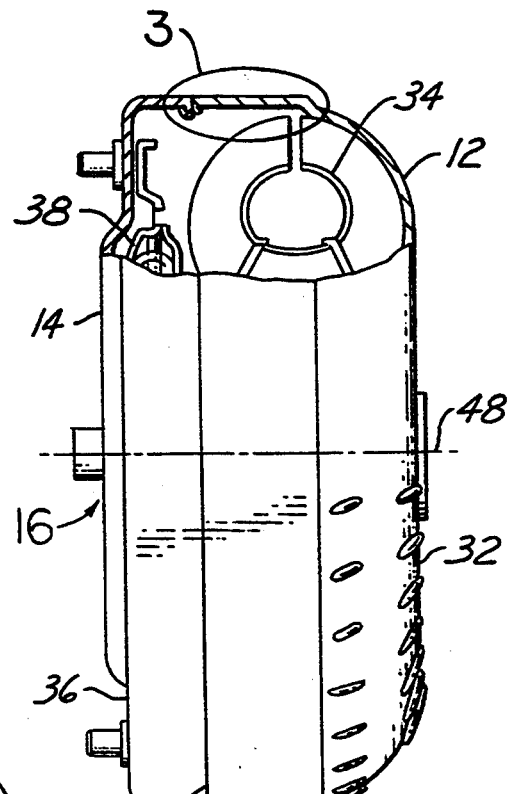
FIG. 2
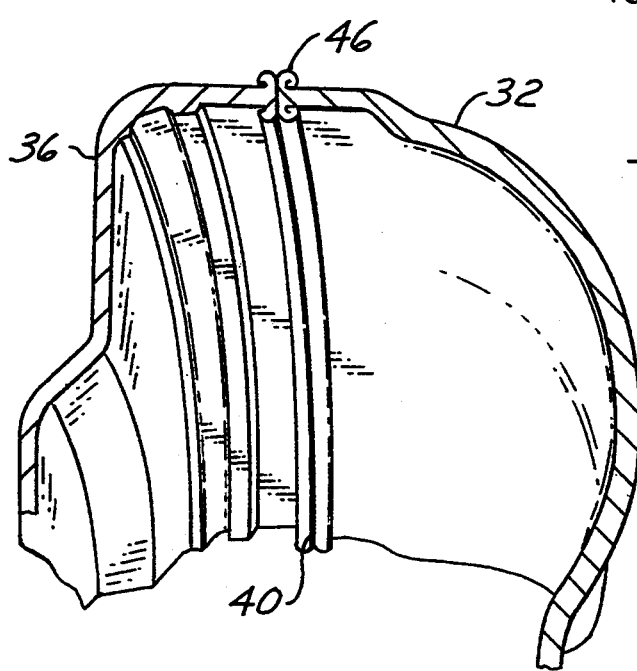
FIG. 4

METHOD AND APPARATUS FOR PRODUCING HERMETIC TORQUE CONVERTER SEAM

FIELD OF THE INVENTION

The present invention relates to a method and apparatus for welding and more particularly to a method and apparatus for precision welding a torque converter seam.

BACKGROUND OF THE INVENTION

Currently, when affixing a torque converter impeller assembly to a cover assembly before positioning it within a vehicle transmission, welding is used to form a seam affixing the two pieces together. The types of welding methods currently used are gas metal arc welding, which is the most common method, laser beam welding and electron beam welding. All three types are fusion welding methods. However, these methods of welding have drawbacks when used in this type of application.

With the aforementioned welding methods, significant joint preparation and design is required since these methods are sensitive to oil and grease being on the surfaces being welded and the joints do not form a simple butt joint. This complicates the operation and maintenance required in the welding process for high volume production, which increases the time require to complete a weld, thus reducing productivity. The cost of filler material also adds to the cost of operation. The desire, then, exists for a low maintenance, high reliability method to join the two assemblies together with minimal operating time per weld. To accomplish this objective, it is also desired to have easy set-up before each weld and good repeatability from one weld to the next, while keeping costs low.

Further, with the three weld methods described above, there are consumables, such as burning gas, which can be environmental concerns. Thus, the desire exists to minimize the associated environmental concerns associated with the welding of the two assemblies.

The torque converter is require to have a continuous leak proof closure, i.e., a hermetic closure, around the seam. This is because the torque converter will contain a fluid under pressure essential to the operation of the torque converter. To accomplish this, it is preferred that there be no gap and filler material between the two assemblies after welding, since this will improve the first time leak proof capability and will help to improve the dimensional integrity by removing distortion from other processes that require more heat along with the use of the fillers. Additionally, by removing the need for filler material and reducing the heat generated at the weld, it will be easier to satisfy all dimensional, joint strength and rigidity requirements, while still keeping the cost of welding to a minimum.

A different type of joining method, that does not require gaps or filler material, is friction welding. Currently, friction welding is used for other types of applications but not for producing torque converter seams. Friction welding does not require fillers and is a type of welding that is easy to set up and repeatable since it is not sensitive to grease and oil on the workpiece surfaces. Friction welding does not have the potential environmental concerns of welding methods that release gas during the welding process. It is also a solid state process that produces strong joints with good dimensional tolerances while assuring a good hermetic seal along the weld seam since the weld is created by diffusion rather than fusion.

SUMMARY OF THE INVENTION

In its embodiments, the present invention contemplates a method for joining a torque converter impeller assembly to a cover assembly to form a torque converter. The method includes orienting the impeller assembly and cover assembly in assembled relationship such that respective surfaces to be joined face each other and are in axial and radial proximity to one another; causing relative rotation between the assemblies about an axis coincident with the axis of the torque converter; axially moving one assembly relative to the other to bring the surfaces to be joined into contact with each other; holding the two assemblies together for a predetermined interval such that heat is generated at the surfaces to be joined as the two surfaces slip relative to one another; stopping relative rotation of the assemblies; and applying an axial forging force to produce a friction weld between the surfaces and produce the final dimensions for the torque converter.

The present invention further contemplates a mechanism for friction welding a weld surface of a torque converter impeller assembly to a weld surface of a cover assembly. The mechanism includes a stationary support for securely holding one of the assemblies and a movable support for securely holding the other of the assemblies such that the respective weld surfaces will face each other in axial and radial proximity to one another. The mechanism further includes a rotation means for selectively causing the movable support to rotate about an axis coincident with the axis of the torque converter and a translation means for selectively causing the axial support to move axially relative to the stationary support, whereby the impeller assembly can be friction welded to the cover assembly to form a torque converter of proper dimensions.

Accordingly, an object of the present invention is to provide a method and apparatus for friction welding a torque converter impeller assembly to a cover assembly forming a hermetic seal with good dimensional tolerances while reducing the cost of producing the seal and reducing the environmental concerns.

An advantage of the present invention is the cost savings from reduced time required to set up and complete a weld forming a hermetic seal.

A further advantage of the present invention is the improved joint strength and structural tolerances and more consistent hermetic seals.

A still further advantage is the reduced environmental concerns associated with the process gained from avoiding the release of gas during the welding process.

Another advantage is the fact that the heat generated by friction welding is more localized than the above discussed methods and therefore there is less chance of heat distortion caused during the welding process.

BRIEF DESCRIPTION OF THE DRAWINGS

FIG. 1 is a perspective schematic view of a friction welding machine and torque converter in accordance with the present invention;

FIG. 2 is a partially sectioned side view of a torque converter in accordance with the present invention;

FIG. 3 is a view, on an enlarged scale, of the encircled area 3 in FIG. 2; and

FIG. 4 is a cross-sectional view of a portion of a impeller assembly shell and cover in accordance with the present invention.

DETAILED DESCRIPTION OF THE PREFERRED EMBODIMENTS

FIG. 1 shows a friction welding machine 10 for welding a torque converter impeller assembly 12 to a cover assembly 14 to form a torque converter 16. Friction welding machine 10 includes a base 18 having a first stationary support 20 mounted on one end and a second stationary support 22 mounted at the other end. First stationary support 20 includes a stationary mount 24 affixed thereto that is adapted to receive and firmly support cover assembly 14. Second stationary support 22 includes a motor unit 26 mounted therein, coupled to an axial extension unit 28 and a rotatable mount 30. The motor unit 26 can be a mechanical, hydraulic, pneumatic or electrical means.

Motor unit 26 can induce axial motion in axial extension unit 28 and can induce rotational motion in rotatable mount 30. Rotatable mount 30 is adapted to receive and firmly support torque converter impeller assembly 12.

FIGS. 2, 3 and 4 show torque converter 16. It includes an impeller assembly shell 32, which supports impeller assembly components 34 within it, and a cover 36, which contains a bypass clutch and damper 38 within it. Torque converter seam 40, i.e., the weld joint, secures the two assemblies together to form the complete torque converter 16.

Impeller assembly shell 32 and cover 36 are preferably made out of 1010 steel or high strength low alloy (HSLA) steel, although the friction welding process is very compatible with the use of broad variety of materials. Prior to the welding process, impeller assembly shell 32 and cover 36 both have about ¼ inch of extra material on their weld surfaces 42 and 44, respectively, beyond what is needed for the final dimensions of the torque converter 16. The final dimensions of torque converter 16 will be arrived at during the friction welding process. The two weld surfaces 42 and 44 are circular and have substantially the same diameter, so when they are aligned concentrically, the two surfaces 42 and 44 can be brought into contact about their entire circumferences.

The process of completing torque converter 16 starts by assembling bypass clutch and damper 38 into cover 36 to form cover assembly 14, and assembling impeller assembly components 34 into impeller assembly shell 32 to form torque converter impeller assembly 12. Cover assembly 14 is mounted onto stationary mount 24 and held fixed in place and torque converter impeller assembly 12 is mounted onto rotatable mount 30 spaced from cover assembly 14. Impeller assembly shell 32 is clamped about its outer diameter, to prevent vibration during the welding process. The two mounts are aligned so that the two assemblies line up concentric with one another with the weld surfaces 42 and 44 facing each other.

Axial extension unit 28 moves impeller assembly 12 axially toward cover assembly 14 until welding surfaces 42 and 44 are in close proximity to one another. Motor unit 26 begins to rotate rotatable mount 30 and impeller assembly 12, about an axis 48 of rotation of torque converter 16, rapidly up to a predetermined speed.

Axial extension unit 28 pushes impeller assembly 12 towards cover assembly 14 until the two are brought together and an axial friction welding force is applied during this relative rotation. Assemblies 12 and 14 remain under these conditions for a predetermined amount of time, or until a specified length or upset takes place when the temperature is calculated to be sufficient to create a friction weld at weld surfaces 42 and 44. The heat is generated locally as weld surfaces 42 and 44 rub together.

Once the predetermined amount of time or upset is reached, as the case may be, the rotation of impeller assembly 12 is stopped. Axial extension unit 28 then presses impeller assembly 12 toward cover assembly 14 a predetermined distance, based on the proper dimensions for torque converter 16, using a forging force. Impeller assembly shell 32 and cover 36 are now welded together forming torque converter seam 40. When the metal cools and is hardened sufficiently, torque converter 16 is removed from friction welding machine 10.

An advantage to this type of welding is the fact that the heat is substantially confined to the areas of contact. Since the material remains below its melting point, it will be plastically displaced during welding, but will not melt and form a weld line like other types of welding.

An example of the process for a typical torque converter having an outside diameter of approximately 276 mm and material thickness of approximately 4 mm will now be discussed. The two assemblies, being mounted, begin rotating impeller assembly 12 at about 600 RPMs and then axially move it into contact with cover assembly 14 with an initial friction welding force of approximately 4.5 tons. As weld surfaces 42 and 44 heat up, the rotational speed can be reduced to about 300 RPMs while the friction welding force is increased to about 11.5 tons. This will cause some plastic deformation while the two assemblies 12 and 14 are still rotating relative to one another. Once an approximately 4.5 mm length loss, i.e., 4.5 mm of plastic deformation, an upset length will be reached and impeller assembly 12 will be stopped. Then, axial extension unit 28 will press the two assemblies 12 and 14 together with approximately 22.5 tons of forging force, applied for approximately 4 seconds, until the proper dimensions of completed torque converter 16 are reached.

In this process, the two assemblies 12 and 14 can be reversed, and cover assembly 14 could be set up to be the one that rotates, rather that impeller assembly 12.

In the welding process, material upset or flash 46 is formed along seam 40, which formed a butt weld joint configuration. This provides a continuous leak proof closure around seam 40 because no gap and gas porosity in the filler material exists between the two assemblies after welding. The resulting butt weld also has good strength characteristics and can be accurately produced in large quantities holding to very accurate dimensions since the components are held together in their correct relationship during the final welding process.

Flash 46 on the outside of seam 40 can be ground off if desired for handling purposes or for installation clearances, but need not be.

While certain embodiments of the present invention have been described in detail, those familiar with the art to which this invention relates will recognize various alternative designs and embodiments for practicing the invention as defined by the following claims.

I claim:

1. A method for joining a torque converter impeller assembly to a cover assembly to form a torque converter comprising:

assembling impeller assembly components into an impeller assembly shell to form the torque converter impeller assembly;

assembling a bypass clutch and damper into a cover to form the cover assembly;

orienting the impeller assembly and cover assembly in assembled relationship such that respective surfaces to be joined face each other and are in axial and radial proximity to one another;

causing relative rotation between the assemblies about an axis coincident with the axis of the torque converter;

axially moving one assembly relative to the other to bring the surfaces to be joined into contact with each other;

holding the two assemblies together with a friction welding force for a predetermined interval such that heat is generated at the surfaces to be joined as the two surfaces slip relative to each other;

stopping relative rotation of the assemblies; and applying an axial forging force to produce a friction weld between the surfaces and produce the final dimensions for the torque converter.

2. A method according to claim 1 wherein the step of causing relative rotation comprises holding one of the assemblies stationary while rotating the other of the assemblies and the step of axially moving comprises holding one of the assemblies stationary while axially moving the other of the assemblies.

3. A method according to claim 1 further comprising the step of grinding off flash formed along the weld.

4. A method according to claim 1 wherein the predetermined interval of holding the two assemblies together is an interval of time.

5. A method according to claim 1 wherein the predetermined interval of holding the two assemblies together is an upset length.

6. A method according to claim 1 further comprising reducing the speed of relative rotation between the assemblies while increasing the friction welding force as the two assemblies are held together for the predetermined interval.

* * * * *